G. W. FISHER.
HAY FORK ATTACHMENT.
APPLICATION FILED JUNE 5, 1917.
1,244,437.
Patented Oct. 23, 1917.
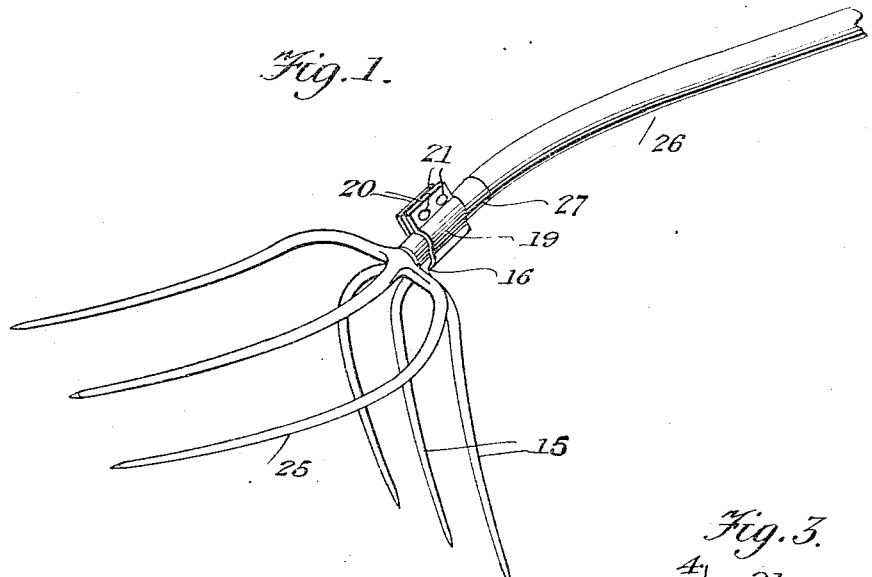
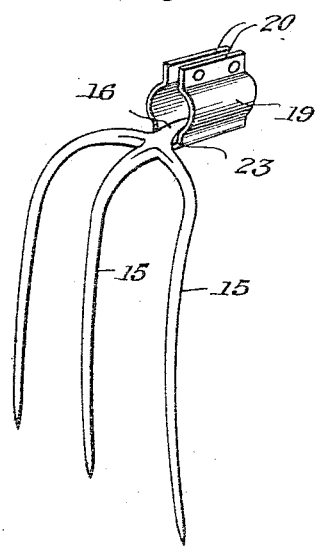
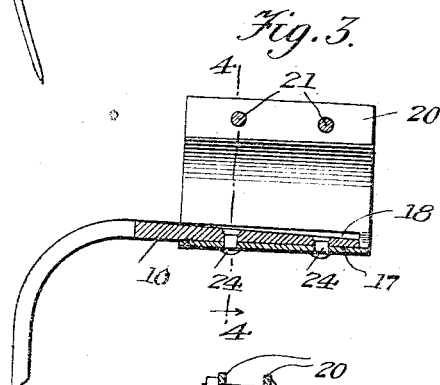
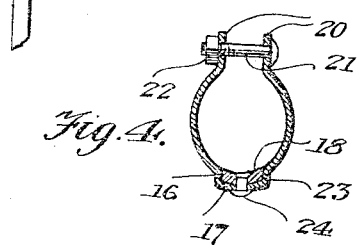
WITNESSES
R. J. Hoge
Wm. Bagger
INVENTOR
George W. Fisher
BY Victor J. Evans
ATTORNEY

UNITED STATES PATENT OFFICE.

GEORGE W. FISHER, OF RAVENNA, MICHIGAN.

HAY-FORK ATTACHMENT.

1,244,437.

Specification of Letters Patent.　　Patented Oct. 23, 1917.

Application filed June 5, 1917.　Serial No. 172,952.

*To all whom it may concern:*

Be it known that I, GEORGE W. FISHER, a citizen of the United States, residing at Ravenna, in the county of Muskegon and State of Michigan, have invented new and useful Improvements in Hay-Fork Attachments, of which the following is a specification.

This invention relates to an attachment for hay forks, said attachment being in the nature of a pulling hook which may be readily applied to the handle of any ordinary pitching fork, regardless of the number of tines with which said fork is provided, and which, without interfering with the use of the pitching fork as such, will be extremely serviceable for the purpose of pulling material such as hay, straw, manure and the like in the direction of the operator for more convenient handling with the pitch fork.

A further object of the invention is to produce a hook attachment of simple and improved construction which may be readily and quickly applied to and disassembled from the handle of any ordinary pitching fork without regard to any peculiarities in the construction of such pitching fork. A further object of the invention is to produce a pulling hook attachment for pitch forks, the same consisting of an ordinary pitch fork head having its tang or shank shaped and bent at a suitable angle and combined with means for mounting it detachably on the handle of a pitch fork.

A further object of the invention is to simplify and improve the means whereby the improved hook attachment is applied to and mounted in position upon the handle of a pitching fork.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing:

Figure 1 is a perspective view showing a pitching fork to which the improved attachment has been applied.

Fig. 2 is a perspective view showing the attachment disassembled from the fork.

Fig. 3 is a sectional detail view taken longitudinally through the sleeve and shank of the attachment.

Fig. 4 is a transverse sectional detail view taken on the line 4—4 in Fig. 3.

Corresponding parts in the several figures of the drawing are denoted by like characters of reference.

The improved attachment comprises a plurality of tines 15 which are connected with a shank 16 with respect to which the said tines extend substantially at right angles. The shank 16 is forged or otherwise treated to produce a convex face 17 and a concave face 18 as will be best seen in Fig. 4. This attachment may be conveniently and inexpensively formed by taking an ordinary pitching fork head, and properly shaping the shank or tang thereof to produce the convex and concave faces 17 and 18 after which the shank is bent substantially at right angles to the tines as clearly seen in Figs. 2 and 3. The attachment may thus be formed from a standard article of manufacture without necessity for making special dies or other means for the production thereof.

19 designates a split sleeve having flanges 20 and bolts 21 extending through said flanges and provided with tightening nuts 22. The sleeve is formed with an interior longitudinal channel 23 to receive the shank 16, the latter being securely riveted or otherwise connected with the sleeve by fastening members 24.

25 designates the head of an ordinary pitching fork, said fork including a handle 26 having a ferrule 27. The pitching fork head may have any number of tines irrespective of the number of tines with which the hook attachment is provided.

To apply the attachment to a pitching fork, the handle of the latter is placed within the sleeve 19, the latter being slid along the handle until it embraces the ferrule 27, said ferrule forming obviously a part of the handle. The sleeve is turned, if necessary, about the axis of the handle until the tines 15 project inwardly with respect to the tines of the fork 25 after which the nuts 22 are tightened upon the bolts 21, thus clamping the sleeve securely on the ferrule. The hook device may now be utilized in the manner described and will be found extremely convenient for a variety of purposes when it is desired to drag material from a distance to a point within convenient reach of the operator.

The improved device is simple and inexpensive, and it may be easily and quickly applied to or detached from the handle of any ordinary pitching fork. The shank 16 has the concave face 18, the curvature of which enables it to snugly engage the ferrule part of the handle of any ordinary pitching fork, and the split sleeve being provided with a longitudinal channel for the reception of the shank, thus enabling the sleeve to snugly embrace the handle and enabling the device to be held in position with the utmost security by simply tightening the nuts on the clamping bolts.

Having thus described the invention, what is claimed as new is:

1. The combination with a pitching fork having a fork head provided with a plurality of tines and a handle with which said fork head is connected, of a clamping sleeve mounted on the handle adjacent to the fork head, a shank extending longitudinally through said sleeve and connected therewith, and a second fork head connected with the shank and bent angularly with respect to said shank and the first-mentioned fork head and clear of the latter to produce a pulling hook.

2. The combination with a pitching fork having a fork head provided with a plurality of tines and a handle with which said fork head is connected, of a clamping sleeve mounted on the handle adjacent to the fork head, a shank extending longitudinally through said sleeve and connected therewith, and a second fork head connected with the shank and bent angularly with respect to said shank and the first-mentioned fork head and clear of the latter to produce a pulling hook; the two fork heads being mutually disconnected to permit fork heads having different numbers of tines to be centered with respect to one another.

In testimony whereof I affix my signature.

GEORGE W. FISHER.

Copies of this patent may be obtained for five cents each, by addressing the "Commissioner of Patents, Washington, D. C."